US009807713B2

(12) United States Patent
Blankenship et al.

(10) Patent No.: US 9,807,713 B2
(45) Date of Patent: Oct. 31, 2017

(54) SYNCHRONIZATION IN COMMUNICATIONS NETWORKS

(71) Applicant: Telefonaktiebolaget L M Ericsson (publ), Stockholm (SE)

(72) Inventors: Yufei Blankenship, Kildeer, IL (US); Bengt Lindoff, Bjarred (SE); Stefano Sorrentino, Solna (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 217 days.

(21) Appl. No.: 14/541,313

(22) Filed: Nov. 14, 2014

(65) Prior Publication Data
US 2016/0142987 A1 May 19, 2016

(51) Int. Cl.
*H04W 56/00* (2009.01)
*H04L 5/00* (2006.01)
(Continued)

(52) U.S. Cl.
CPC ............. *H04W 56/00* (2013.01); *H04L 5/003* (2013.01); *H04W 4/005* (2013.01);
(Continued)

(58) Field of Classification Search
CPC ... H04W 56/00; H04W 76/046; H04W 4/005; H04W 4/06; H04W 52/0225;
(Continued)

(56) References Cited

U.S. PATENT DOCUMENTS 8,923,340 B2 * 12/2014 Hassan ................ H04L 5/0053
370/329
9,379,856 B2 * 6/2016 Khoryaev ............ H04W 48/16
(Continued)

FOREIGN PATENT DOCUMENTS

EP     2665297 A1    11/2013
WO  2010006649 A1     1/2010
(Continued)

OTHER PUBLICATIONS

PCT International Search Report, mailed Feb. 9, 2016, in connection with International Application No. PCT/EP2015/074443, all pages.
(Continued)

*Primary Examiner* — Brian O'Connor
(74) *Attorney, Agent, or Firm* — Leffler Intellectual Property Law, PLLC

(57) ABSTRACT

According to a first aspect there is presented a method for synchronization in a wireless device-to-device (D2D) based communications network as performed by a first wireless device. The method comprises identifying an attempt to make a network connection on a default sub-channel over a D2D communications interface from a second wireless device. The method comprises transmitting control information on the default sub-channel to the second wireless device, wherein the control information comprises an indicator of an operational sub-channel, and wherein the operational sub-channel is for subsequent D2D communication between the first wireless device and the second wireless device.

32 Claims, 5 Drawing Sheets

(51) Int. Cl.
  *H04W 4/00* (2009.01)
  *H04W 76/04* (2009.01)
  *H04L 29/06* (2006.01)
  *H04W 76/02* (2009.01)
  *H04W 28/02* (2009.01)
  *H04W 84/18* (2009.01)
  *H04W 52/02* (2009.01)
  *H04W 4/06* (2009.01)
  *H04W 72/04* (2009.01)
  *H04W 72/00* (2009.01)

(52) U.S. Cl.
  CPC ....... *H04W 76/046* (2013.01); *H04L 63/0428* (2013.01); *H04W 4/06* (2013.01); *H04W 28/0268* (2013.01); *H04W 52/0225* (2013.01); *H04W 72/005* (2013.01); *H04W 72/048* (2013.01); *H04W 76/021* (2013.01); *H04W 76/023* (2013.01); *H04W 84/18* (2013.01); *Y02B 60/50* (2013.01)

(58) Field of Classification Search
  CPC ............... H04W 84/18; H04W 76/021; H04W 28/0268; H04W 76/023; H04L 5/003; H04L 63/0428
  See application file for complete search history.

(56) References Cited

U.S. PATENT DOCUMENTS

| | | | |
|---|---|---|---|
| 2013/0157670 A1 | 6/2013 | Koskela et al. | |
| 2013/0182614 A1 | 7/2013 | Kumar et al. | |
| 2014/0010099 A1 | 1/2014 | Chiu et al. | |
| 2014/0098665 A1* | 4/2014 | Hassan | H04L 5/0053 370/230 |
| 2014/0169199 A1* | 6/2014 | Lamy-Bergot | H04W 24/08 370/252 |
| 2014/0293851 A1 | 10/2014 | Abraham et al. | |
| 2015/0098414 A1* | 4/2015 | Kuo | H04W 72/10 370/329 |
| 2015/0327311 A1* | 11/2015 | Wei | H04L 12/6418 370/329 |
| 2016/0150391 A1* | 5/2016 | Lee | H04W 56/002 370/329 |
| 2016/0234855 A1* | 8/2016 | Panteleev | H04W 36/0055 |
| 2016/0270030 A1* | 9/2016 | Yu | H04W 72/005 |
| 2016/0270136 A1* | 9/2016 | Liu | H04W 48/16 |
| 2016/0278152 A1* | 9/2016 | Lei | H04W 76/023 |
| 2016/0323869 A1* | 11/2016 | Xu | H04W 72/0473 |
| 2016/0345307 A1* | 11/2016 | Huang | H04W 52/0216 |

FOREIGN PATENT DOCUMENTS

| | | |
|---|---|---|
| WO | 2013162196 A1 | 10/2013 |
| WO | 2013177447 A1 | 11/2013 |
| WO | 2014168571 A2 | 10/2014 |

OTHER PUBLICATIONS

PCT Written Opinion, mailed Feb. 9, 2016, in connection with International Application No. PCT/EP2015/074443, all pages.
3GPP TSG RAN WG1 Meeting #75, R1-135175, San Francisco, USA, Nov. 11-15, 2013, Synchronization Design for D2D communication, 4 pages.
3GPP TSG RAN WG1 Meeting #77, R1-142147, Seoul, Korea, May 19-23, 2014, Discussion on Signaling for D2D Communication Resource Allocation, 8 pages.
PCT International Search Report, mailed Feb. 8, 2016, in connection with International Application No. PCT/EP2015/074417, all pages.
PCT Written Opinion, mailed Feb. 8, 2016, in connection with International Application No. PCT/EP2015/074417, all pages.
3GPP TSG RAN WG2 #84, R2-134311, San Francisco, USA, Nov. 11-15, 2013, Resource allocation schemes for D2D communication, 11 pages.
PCT International Search Report, mailed Jan. 19, 2016, in connection with International Application No. PCT/EP2015/074477, all pages.
PCT Written Opinion, mailed Jan. 19, 2016, in connection with International Application No. PCT/EP2015/074477, all pages.

* cited by examiner

SYNCHRONIZATION IN COMMUNICATIONS NETWORKS

Embodiments presented herein relate to communications network, and particularly to methods, a wireless device, computer programs, and computer program products for synchronization in a wireless device-to-device based communications network.

BACKGROUND

In communications networks, there may be a challenge to obtain good performance and capacity for a given communications protocol, its parameters and the physical environment in which the communications network is deployed.

For example, device-to-device (D2D) communications has recently been proposed as an underlay to cellular communications networks as a means to take advantage of the proximity of communicating devices and at the same time to allow the communicating devices to operate in a controlled interference environment. Typically, it is suggested that such D2D communication shares the same spectrum as the cellular communications network, for example by reserving some of the cellular uplink resources for D2D purposes.

D2D communication is as such known in the art and a component of existing wireless technologies, including ad hoc and cellular networks. Examples of D2D communication based techniques include Bluetooth and several variants of the IEEE 802.11 standards suite such as WiFi Direct. These D2D based communication systems operate in unlicensed spectrum.

D2D communications is currently being defined for Release 12 (Rel-12) of the 3rd Generation Partnership Project (3GPP) Long Term Evolution (LTE). A range of services have been identified, which can be provided by the 3GPP system based on user equipment (i.e., communicating device) being in proximity to each other.

Two ways to utilize the D2D applications communication link are direct discovery and direct communication. In both cases, the transmitting communicating device sends D2D signals that should be directly received at least by the intended receiving communicating device. Additional applications include relaying, where a communicating device relays data received from a network infrastructure or a communicating device to another communicating device, or vice-versa. Some services which may benefit from such D2D communication are commercial services and Public Safety.

Allocating dedicated spectrum for D2D purposes may be regarded as a less likely alternative as spectrum is a scarce resource and (dynamic) sharing between the D2D services and cellular services could be more flexible and could provide higher spectrum efficiency. In terms of the physical layer, the Rel-12 D2D link operates in uplink spectrum (in the case of Frequency-Division Duplex, FDD) or uplink sub-frames (in the case of Time-Division Duplex, TDD). A D2D signal and wide area network signal can be multiplexed on a given carrier using Time Division Multiplexing (TDM).

D2D based communication networks should also be able to operate in multi-carrier scenarios where the cellular communications network and/or the D2D network is/are configured to operate on multiple carriers. Such carriers do not necessarily belong to a single network operator and are not necessarily coordinated and synchronized.

3GPP LTE has been investigated as a competitive radio access technology for efficient support of Machine-Type Communication (MTC). Some MTC use cases relate to devices being deployed deep inside buildings, which would require coverage enhancement in comparison to the defined coverage of the existing cellular communications network. However, it may be efficient for network operators to be able to serve MTC user equipment using already deployed radio access technology.

3GPP LTE Rel-12 has defined a user equipment power saving mode, allowing long battery lifetime and a new user equipment category allowing reduced modem complexity. In 3GPP LTE Rel-13, further development of MTC may further reduce user equipment cost and provide coverage enhancement. One element to enable cost reduction is to introduce a reduced user equipment radio frequency bandwidth of about 1.4 MHz in the downlink and uplink within any network bandwidth. Lowering the cost of MTC user equipment is a further enabler for implementation of the concept of "internet of things" (IoT). MTC user equipment used for many applications will require low operational power consumption and are expected to communicate with infrequent small burst transmissions.

As a proposal for low power, low complexity MTC communication, the MTC devices may communicate with a relay node by using LTE D2D communication. The relay node may then communicate with a radio access network node (such as an eNodeB) of the cellular communications network (such as LTE). One advantage of using such an approach is that a coverage enhancement (as required in Rel-13) can be reached, as well as some of the MTC complexity being moved to a single relay node. Hence, by using D2D communication via the relay node (that may act as a relay for several MTC devices) a LTE based capillary network structure can be built.

However, D2D links as defined in 3GPP Rel-12 are not defined to support MTC devices.

Hence, there is still a need for an improved synchronization in wireless D2D based communications networks.

SUMMARY

An object of embodiments herein is to provide efficient synchronization in wireless D2D based communications networks.

According to a first aspect there is presented a method for synchronization in a wireless device-to-device (D2D) based communications network. The method is performed by a first wireless device. The method comprises identifying an attempt to make a network connection on a default sub-channel over a D2D communications interface from a second wireless device.

The method comprises transmitting control information on the default sub-channel to the second wireless device, wherein the control information comprises an indicator of an operational sub-channel, and wherein the operational sub-channel is for subsequent D2D communication between the first wireless device and the second wireless device.

Advantageously this provides efficient synchronization in wireless D2D based communications networks.

Advantageously this provides an efficient procedure for configuration of a flexible D2D radio interface in multi-hop communications.

According to a second aspect there is presented a wireless device for synchronization in a wireless device-to-device (D2D) based communications network. The wireless device comprises a processing unit. The processing unit is configured to identify an attempt to make a network connection on a default sub-channel over a D2D communications interface from a second wireless device. The processing unit is configured to transmit control information on the default sub-channel to the second wireless device, wherein the control information comprises an indicator of an operational sub-channel, and wherein the operational sub-channel is for subsequent D2D communication between the first wireless device and the second wireless device.

According to a third aspect there is presented a computer program for synchronization in a wireless device-to-device (D2D) based communications network, the computer program comprising computer program code which, when run on a processing unit of a wireless device, causes the processing unit to perform a method according to the first aspect.

According to a fourth aspect there is presented a method for synchronization in a wireless device-to-device (D2D) based communications network. The method is performed by a second wireless device. The method comprises performing an attempt to make a network connection on a default sub-channel. The method comprises receiving control information on the default sub-channel from at least one of a network node or a first wireless device, wherein the control information comprises an indicator of an operational sub-channel, wherein the operational sub-channel is for subsequent D2D communications with said first wireless device.

According to a fifth aspect there is presented a wireless device for synchronization in a wireless device-to-device (D2D) based communications network. The wireless device comprises a processing unit. The processing unit is configured to perform an attempt to make a network connection on a default sub-channel. The processing unit is configured to receive control information on the default sub-channel from at least one of a network node or a first wireless device, wherein the control information comprises an indicator of an operational sub-channel, wherein the operational sub-channel is for subsequent D2D communications with said first wireless device.

According to a sixth aspect there is presented a computer program for synchronization in a wireless device-to-device (D2D) based communications network, the computer program comprising computer program code which, when run on a processing unit of a wireless device, causes the processing unit to perform a method according to the fourth aspect.

According to a seventh aspect there is presented a computer program product comprising a computer program according to at least one of the third aspect and the sixth aspect and a computer readable means on which the computer program is stored.

It is to be noted that any feature of the first, second, third, fourth, fifth, sixth and seventh aspects may be applied to any other aspect, wherever appropriate. Likewise, any advantage of the first aspect may equally apply to the second, third, fourth, fifth, sixth, and/or seventh aspect, respectively, and vice versa. Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which.

DETAILED DESCRIPTION

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art.

Like numbers refer to like elements throughout the description. Any step or feature illustrated by dashed lines should be regarded as optional.

Figure 1:
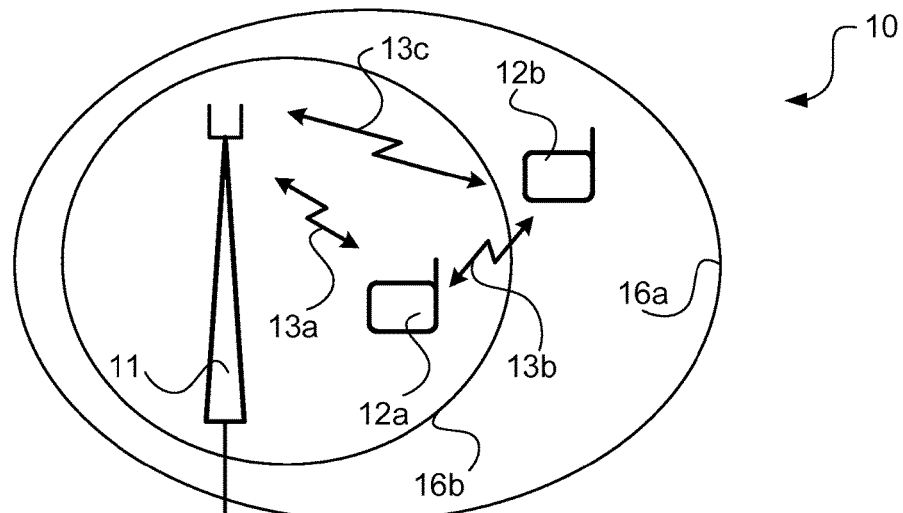
FIG. 1 is a schematic diagram illustrating a communication network according to embodiments.
Figure 1:
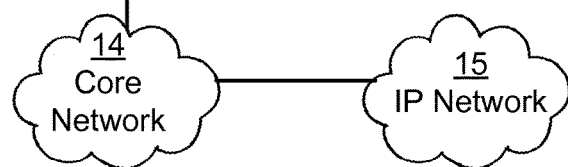

FIG. 1 is a schematic diagram illustrating a communication network 10 where embodiments presented herein can be applied. The communications network 10 may generally comply with any one or a combination of W-CDMA (Wideband Code Division Multiplex), LTE (Long Term Evolution), EDGE (Enhanced Data Rates for GSM Evolution, Enhanced GPRS (General Packet Radio Service)), CDMA2000 (Code Division Multiple Access 2000), Time Division Synchronous Code Division Multiple Access (TD-SCDMA), etc., as long as the principles described hereinafter are applicable.

The communications network 10 comprises at least one network node 11. The network node 11 may be a radio access network node, and may be provided as a radio base station, base station, radio network controller, node B, evolved node B, or WiFi access point.

The at least one network node 11 is operatively to a core network 14 and arranged to function as a radio base station so as to provide network access to a service network 15 in the form or radio connectivity within a coverage region 16a, 16b to wireless devices 12a, 12b. The wireless devices 12a, 12b may be any combination of a user equipment (UE), a smartphone, a mobile phone, a tablet computer, a laptop computer, a stationary computer, a device-to-device (D2D) communications device, a machine-type communication (MTC) device, a wireless sensor, etc. The wireless devices 12a, 12b may thus be enabled services and data as provided by the service network 15 by establishing a wireless connection to the network node 11. However, it may be so that some of the wireless devices 12a, 12b, say wireless device 12b, are not able to establish a direct wireless connection (i.e., via one link 13c) to the network node 11. Instead, such a wireless device 12b may establish indirect wireless connections (i.e., via at least two links 13a, 13b, with one of the wireless devices its acting as a relay between each pair of links) to the network node 11. Such links 13*a*, 13*b*, 13*c* may be established based on D2D communications. In general, D2D communication comprises direct discovery and direct communication between two wireless devices. In some contexts, the D2D communication link may be referred to as a sidelink.

The wireless device 12*a* providing the indirect wireless connection thus acts as a relay device and is hereinafter referred to as a relay device, or a first wireless device 12*a*. The wireless device 12*a* being provided with the indirect wireless connection may thus be regarded as acting as a MTC device and is hereinafter referred to as a second wireless device 12*b*.

When acting as a relay, the first wireless device 12*a* is assumed to be in-coverage of the network node 11, i.e., inside the currently active coverage region of the network node 11. The second wireless device 12*b* may be in-coverage (i.e., when the current coverage of the network node is defined by coverage region 16*a*) or out-of-coverage of the network node 11 (i.e., when the current coverage of the network node is defined by coverage region 16*b*). The second wireless device 12*b* is assumed to be capable of device-to-device (D2D) communication in addition to direct communications with the network node 11.

There are currently no mechanisms for determining if the second wireless device 12*b* should operatively connect directly to the network node 11 or indirectly to the network node 11 by using a relay connection. Furthermore, in case the second wireless device 12*b* only supports a smaller system bandwidth than the total system bandwidth (e.g., 6 physical resource blocks PRBs), where the system bandwidth may comprise 50 or 100 PRBs) there are currently no proper mechanisms for determining which sub channels to use.

At least some of the embodiments disclosed herein provide mechanisms for a second wireless device 12*b* to select the appropriate sub-channel to operate on. At least some of the embodiments disclosed herein provide mechanisms for a second wireless device 12*b* to receive synchronization signals over different sub-channels of the system bandwidth available for the D2D communications links. At least some of the embodiments disclosed herein provide mechanisms for a second wireless device 12*b* to select a proper link 13*b*, 13*c* to operate on.

The embodiments disclosed herein particularly relate to synchronization in a wireless D2D based communications network 10. In order to obtain such synchronization there is provided a wireless device acting as either a first wireless device or a second wireless device, a method performed by the first wireless device, a method performed by the second wireless device, computer programs comprising code, for example in the form of computer program products, that when run on a processing unit of a wireless device, causes the processing unit to perform the methods.

Figure 2A:
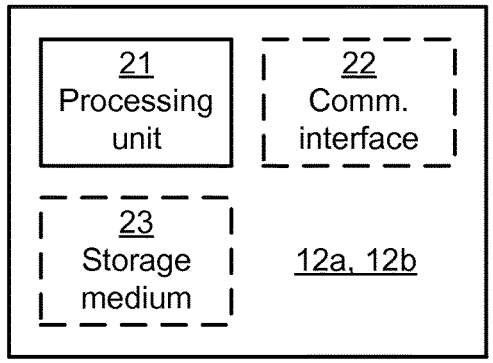
FIG. 2a is a schematic diagram showing functional units of a wireless device according to an embodiment.

FIG. 2*a* schematically illustrates, in terms of a number of functional units, the components of a wireless device 12*a*, 12*b* according to an embodiment. A processing unit 21 is provided using any combination of one or more of a suitable central processing unit (CPU), multiprocessor, microcontroller, digital signal processor (DSP), application specific integrated circuit (ASIC), field programmable gate arrays (FPGA) etc., capable of executing software instructions stored in a computer program product 31*a*, 31*b* (as in FIG. 3), e.g. in the form of a storage medium 23. Thus the processing unit 21 is thereby arranged to execute methods as herein disclosed. The storage medium 23 may also comprise persistent storage, which, for example, can be any single one or combination of magnetic memory, optical memory, solid state memory or even remotely mounted memory. The wireless device 12*a-e* may further comprise a communications interface 22 for communications with another wireless device 12*a-e* and/or a network node 11. As such the communications interface 22 may comprise one or more transmitters and receivers, comprising analogue and digital components and a suitable number of antennas for radio communications. The processing unit 21 controls the general operation of the wireless device 12*a-e* e.g. by sending data and control signals to the communications interface 22 and the storage medium 23, by receiving data and reports from the communications interface 22, and by retrieving data and instructions from the storage medium 23. Other components, as well as the related functionality, of the wireless device 12*a-e* are omitted in order not to obscure the concepts presented herein. The wireless device 12*a-e* may be provided as a standalone device or as a part of a further device. For example, the wireless device 12*a-e* may be provided in a relay device or in an MTC device.

Figure 2B:
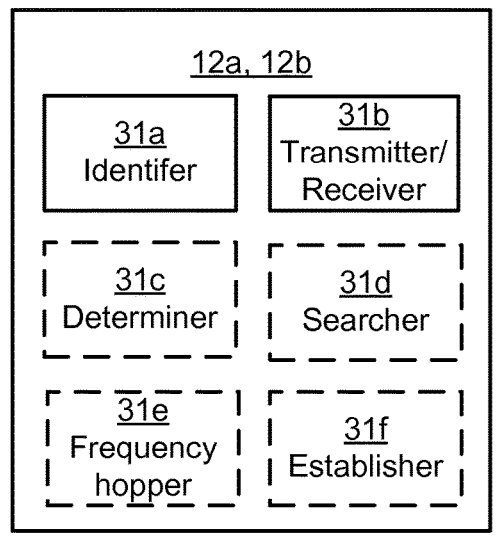
FIG. 2b is a schematic diagram showing functional modules of a wireless device according to an embodiment.

FIG. 2*b* schematically illustrates, in terms of a number of functional modules, the components of a wireless device 12*a-e* according to an embodiment. The wireless device 12*a-e* of FIG. 2*b* comprises a number of functional modules; an identifier module 31*a* configured to perform below step S102, an a transmitter and/or receiver module 31*b* configured to perform below step S106, S110, S112, S114, S116, S202*a*, S204, S206, S208, S212, S214, S216. The wireless device 12*a-e* of FIG. 2*b* may further comprises a number of optional functional modules, such as any of a determiner module 31*c* configured to perform below step S104, S108, S218, a searcher module 31*d* configured to perform below step S202, a frequency hopper module 31*e* configured to perform below step S210, and an establisher module 31*f* configured to perform below step S220*a*, S220*b*, S222. The functionality of each functional module 31*a-f* will be further disclosed below in the context of which the functional modules 31*a-f* may be used. In general terms, each functional module 31*a-f* may be implemented in hardware or in software. Preferably, one or more or all functional modules 31*a-f* may be implemented by the processing unit 21, possibly in cooperation with functional units 22 and/or 23. The processing unit 21 may thus be arranged to from the storage medium 23 fetch instructions as provided by a functional module 31*a-f* and to execute these instructions, thereby performing any steps as will be disclosed hereinafter.

Figure 3:
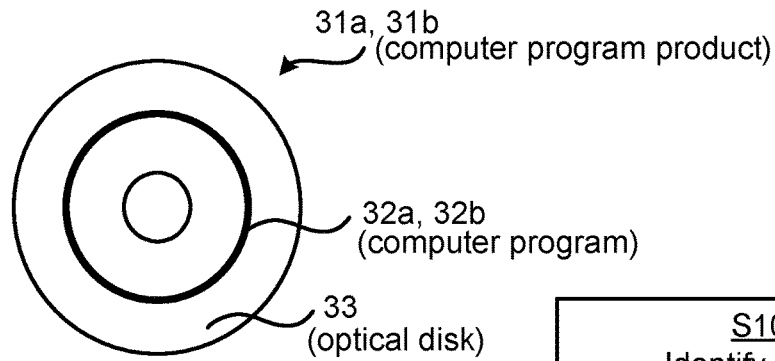
FIG. 3 shows one example of a computer program product comprising computer readable means according to an embodiment.

FIG. 3 shows one example of a computer program product 31*a*, 3113 comprising computer readable means 33. On this computer readable means 33, a computer program 32*a* can be stored, which computer program 32*a* can cause the processing unit 21 and thereto operatively coupled entities and devices, such as the communications interface 22 and the storage medium 23, to execute methods of a first wireless device 12*a* according to embodiments described herein. On this computer readable means 33, a computer program 32*b* can be stored, which computer program 32*b* can cause the processing unit 21 and thereto operatively coupled entities and devices, such as the communications interface 22 and the storage medium 23, to execute methods of a second wireless device 12*b* according to embodiments described herein. The computer program 32*a*, 32*b* and/or computer program product 31*a*, 31*b* may thus provide means for performing any steps as herein disclosed.

In the example of FIG. 3, the computer program product 31*a*, 31*b* is illustrated as including a computer readable optical disc 33, such as a CD (compact disc) or a DVD (digital versatile disc) or a Blu-Ray disc. The computer program product 31a, 31b could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, while the computer program 32a, 32b is here schematically shown as a track on the depicted optical disk 33, the computer program 32a, 32b can be stored in any way which is suitable for the computer program product 31a, 31b.

Figure 4:
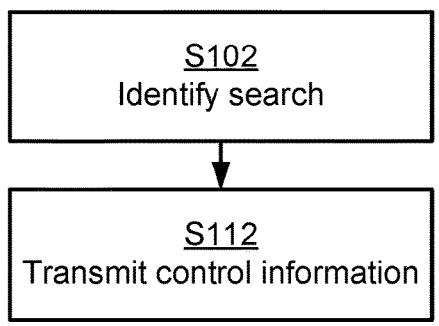
FIGS. 4, 5, 6, and 7.
Figure 6:
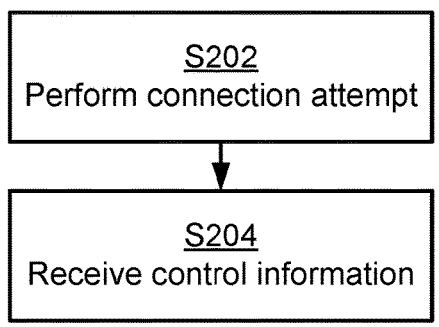
Figure 5:
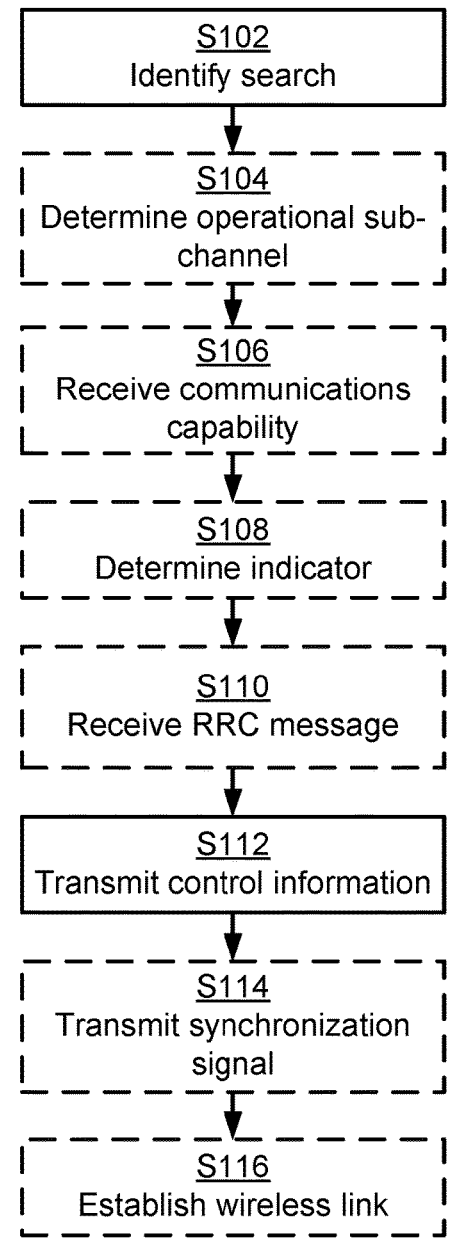
Figure 7:
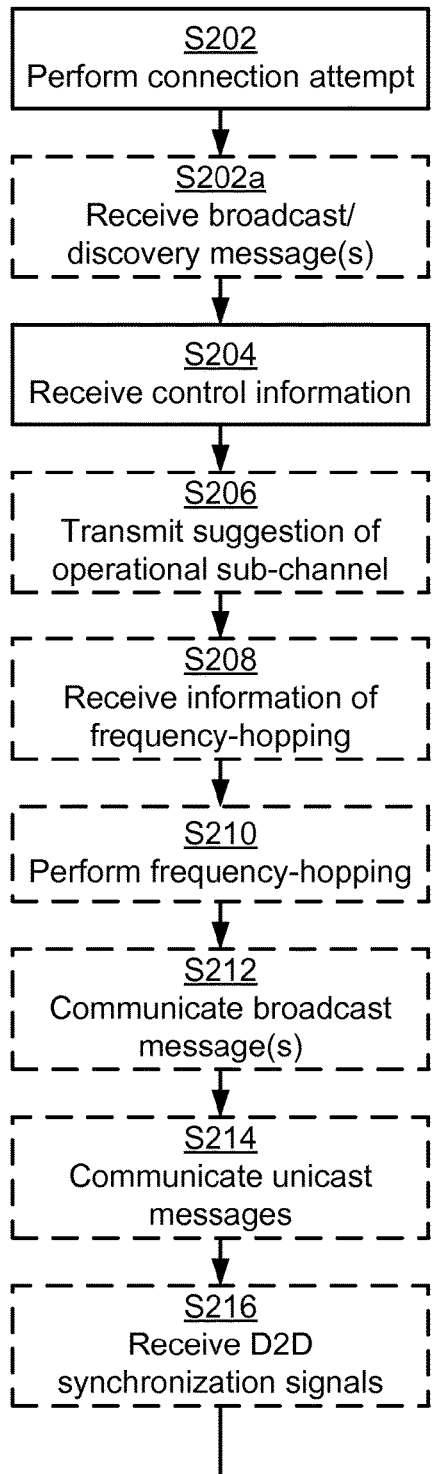
Figure 7:
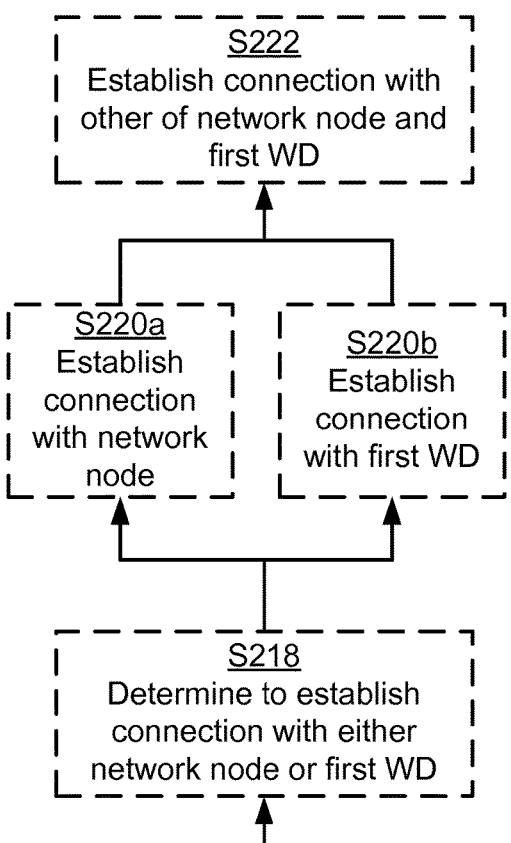

FIGS. 4 and 5 are flow charts illustrating embodiments of methods for synchronization in a wireless D2D based communications network 10. The methods are performed by the processing unit 21 of a wireless device acting as a first wireless device 12a. The methods are advantageously provided as computer programs 32a. FIGS. 6 and 7 are flow charts illustrating embodiments of methods for synchronization in a wireless D2D based communications network 10. The methods are performed by the processing unit 21 of a wireless device acting as a second wireless device 12b. The methods are advantageously provided as computer programs 32b.

Reference is now made to FIG. 4 illustrating a method for synchronization in a wireless D2D based communications network 10 as performed by a first wireless device 12a according to an embodiment.

As will be further disclosed below, a second wireless device 12b may perform an attempt to make a network connection on a default sub-channel over a device-to-device (D2D) communications interface. After a successful search that identifies the first wireless device 12a as a proper node to connect, the second wireless device 12b may attempt to make a connection with the first wireless device 12a by sending a radio signal to the first wireless device 12a. The radio signal may be part of a random access procedure. The random access procedure may be contention-based or non-contention-based, The first wireless device 12a is therefore configured to in a step S102 identify an attempt to make a network connection on the default sub-channel over the D2D communications interface from the second wireless device 12b.

In general terms, the first wireless device 12a, acting as a relay device, may define the synchronization source for the second wireless device 12b. The first wireless device 12b may then periodically transmit D2D synchronization signal (D2DSS) for the second wireless device 12b. Particularly, the first wireless device 12a is configured to in a step S112 transmit control information on the default sub-channel to the second wireless device 12b. The control information comprises an indicator of an operational sub-channel, and wherein the operational sub-channel is for subsequent D2D communication between the first wireless device and the second wireless device.

Embodiments relating to further details of synchronization in a wireless D2D based communications network 10 as performed by the first wireless device 12a will now be disclosed.

The default sub-channel may be one of the sub-channels available to the first wireless device 12a and hence the operational sub-channel may be the same sub-channel as the default sub-channel.

Reference is now made to FIG. 5 illustrating methods for synchronization in a wireless D2D based communications network 10 as performed by a first wireless device 12a according to further embodiments.

Different embodiments relating to sub-channel aspects of the first wireless device 12a will now be described in turn.

Rules may be defined for selecting the sub-band depending on, for example, content, target, or purpose of the sub-channel. For example, the first wireless device 12a may be configured to in an optional step S104 determine an available sub-channel to use as the operational sub-channel based on a Quality-of-Service (QoS) requirement of data content to be transmitted on the operational sub-channel.

In general terms, messages on the default sub-channel and the available sub-channels may be provided in sub-frames. The default sub-channel may comprise a set of physical resource blocks (PRBs) located at system bandwidth center in the sub-frames. Each sub-frame may have a length of 1 ms. The control information may be transmitted in every P:th sub-frame, where P>1 is an integer.

The number of available sub-channels may depend on system bandwidth of said wireless based communications network. For example, the system bandwidth may be in the range 5-20 MHz (corresponding to 25-100 PRBs) and the bandwidth of the second wireless device 12b may be 1.4 MHz (corresponding to 6 PRBs). In general terms, there may be 2 to about 16 times $N_{CC}$ available sub-channels, wherein $N_{CC}$ is the number of component carriers configured for a wireless link on which the sub-channels are transmitted. Further examples of how the sub-channels may be placed in the system bandwidth will be provided below.

Different embodiments relating to synchronization signal aspects of the first wireless device 12a will now be described in turn.

The first wireless device 12a may propose which sub-channel to be used. This proposal may be based on a number of properties, such as, but not limited to, communications capabilities of the second wireless device 12b, traffic load of the second wireless device 12b, etc. Examples of further capabilities include, but are not limited to, information about the transmission modes supported by the second wireless device 12b on the D2D communications interface, different transmission modes (such as mode-1, mode-2, mode-3, etc.) that may be supported, information about transmission configuration, power, power headroom (with respect to the maximum available power when transmitting the broadcast signal), multiple-input multiple-output (MIMO) communications capabilities, supported transmission scheme, and/or other parameter(s) affecting the transmission or reception power of the second wireless device 12b.

Particularly, the first wireless device 12a may be configured to in an optional step S106 receive at least one communications capability of the second wireless device 12b. The first wireless device 12a may then be configured to in an optional step S108 determine the indicator of the operational sub-channel according to the at least one communications capability of the second wireless device 12b. Hence, the first wireless device 12a may be configured to determine which sub-channel to be used by the second wireless device 12b.

Additionally or alternatively, information relating to which sub-channel to be used may be received from the network node. Hence, the network node 11 may be configured to determine which sub-channel to be used by the second wireless device 12b. For example, the control information may be based on the current number of wireless devices served by the network node 11.

Hence, the first wireless device 12a may be configured to in an optional step S110 a radio resource configuration message from the network node 11, wherein the radio resource configuration message indicates the operational sub-channel. The first wireless device 12a may then transmit the control information on the default sub-channel to the second wireless device 12b to the second wireless device 12b as in step S112 above. There may be different ways for the first wireless device 12a to receive the control information and/or identification of the operational sub-channel from the network node 11. For example, higher layer signalling may be used to configure the time-frequency domain location of the sub-channels. For example, the control information and/or identification of the operational sub-channel may be received in a radio resource control (RRC) message.

The first wireless device 12a may further be configured to in an optional step S116 establish a wireless link 13a to the network node 11, wherein communications over the wireless link 13a and communication to the second wireless device 12b (over the wireless link 13b) are time-division multiplexed.

Reference is now made to FIG. 6 illustrating a method for synchronization in a wireless D2D based communications network 10 as performed by a second wireless device 12b according to an embodiment.

As disclosed above with reference to FIG. 1, the second wireless device 12b may be out of network coverage from the network node 11. The second wireless device 12b may therefore perform an attempt to make a network connection. Particularly, the second wireless device 12b is configured to in a step S202 perform an attempt to make a network connection on a default sub-channel.

In general terms, the second wireless device 12b may only consider two sources of the synchronization signal; the network node 11 or the first wireless device 12a. The second wireless device 12b may not consider other devices as a synchronization source even though other devices/nodes may transmit D2DSS.

As noted above, the first wireless device 12a identifies the attempt to make a network connection and in response thereto transmits control information on the default sub-channel to the second wireless device 12b. The second wireless device 12b is therefore configured to in a step S204 receive the control information on the default sub-channel from the first wireless device 12a. Alternatively, the control information is received on the default sub-channel from the network node 11. As noted above, the control information comprises an indicator of an operational sub-channel, wherein the operational sub-channel is for subsequent D2D communications with the first wireless device 12a.

The second wireless device 12b may use the MD2DSS to obtain time and frequency synchronization towards the first wireless device 12a. The second wireless device 12b, may not have any relay capability and may therefore not transmit any synchronization signal.

Embodiments relating to further details of synchronization in a wireless D2D based communications network 10 as performed by the second wireless device 12b will now be disclosed.

The search in step S202 may be performed over a device-to-device (D2D) communications interface. Compared to other wireless devices (such as the first wireless device 12a, the second wireless device 12b, acting as an MTC device, may only operate over a narrow bandwidth, in order to reduce its complexity and power consumption. For example, the second wireless device 12b may only transmit and receive signals over a 1.4 MHz bandwidth (6 PRBs) for both radio frequency front end and baseband. The narrow operational bandwidth does not need to reside in a fixed place in the overall system bandwidth, rather it, in principle, may reside at any place in the system bandwidth, subject only to certain constraints, such as bandwidth granularity, etc.

Thus, to allow the second wireless device 12b to synchronize with the first wireless device 12, the MD2DSS has to reside in the narrow operational bandwidth of the given second wireless device 12b. However, the MD2DSS may not always be located in the central physical resource blocks (PRBs) of the system bandwidth.

Reference is now made to FIG. 7 illustrating methods for synchronization in a wireless D2D based communications network 10 as performed by a second wireless device 12b according to further embodiments.

Different embodiments relating to sub-channel aspects of the second wireless device 12b will now be described in turn.

As noted above, there may be different ways of locating the sub-channels in the system bandwidth. According to a first example, the frequency location operational sub-channel(s) is/are fixed (from the perspective of the second wireless device 12b). That is, the frequency location of the operational sub-channel(s) may be timing based fixed or fixed until a control signal to change said frequency location is received. According to a second example, the frequency location of the operational sub-channel varies over time according to a frequency-hopping pattern. The second wireless device 12b may be configured to in an optional step S208 receive information of the frequency-hopping pattern from either the network node 11 or the first wireless device 12a. The second wireless device 12b may then be configured to in an optional step S210 perform frequency-hopping according to the frequency-hopping pattern to support communication over the operational sub-channel. According to a third example, the operational sub-channel(s) is/are dynamically allocated in terms of bandwidth and/or frequency position in the carrier. That is, frequency location of the operational sub-channel may be dynamically allocated (e.g., in terms of at least bandwidth and carrier frequency position).

There may be different ways for the second wireless device 12b to receive signaling of the operational sub-channel(s). For example, the control information may be received in a radio resource control (RRC) message.

The second wireless device 12b may indicate a preference for which operational sub-channel to be used during a capabilities negotiation. Particularly, the second wireless device 12b may be configured to in an optional step S206 transmit a an indicator of a desired sub-channels to be used as a subsequent operational sub-channel to that one of the network node 11 and the first wireless device 12a from which the control information was received in step S204. For example, the second wireless device 12b may want to reuse a certain operational sub-channel when communicating with other wireless devices. That is, the indication may identify an operational sub-channel already in use for D2D communications by the second wireless device 12b.

Once established, the second wireless device 12b may use the default sub-channel and the operational sub-channel for different purposes. For example, paging or random access-type of messages may be transmitted over the default sub-channel whilst data messages are sent over the operational sub-channel. Hence, the second wireless device 12b may be configured to in an optional step S212 communicate a broadcast message (such as at least one of paging and random access messages) on the default sub-channel; and/or in an optional step S214 communicate a unicast message (such as data messages) on the operational sub-channel.

Different embodiments relating to synchronization signal aspects of the second wireless device 12b will now be described in turn.

The second wireless device 12b may be configured to in an optional step S216 receive D2D synchronization signals (D2DSS) on said default sub-channel. The D2DSS may comprise a primary D2DSS (denoted PD2DSS), and a secondary D2DSS (denoted SD2DSS). The D2DSS may only be received during an initial attachment procedure or during a wake-up procedure of the second wireless device 12b.

The control information may comprise further information, parameters, etc. For example, the control information may further comprises an index to the operational sub-channel, frequency domain location of the operational sub-channel, time-domain offset of the operational sub-channel, and/or periodicity of the operational sub-channel.

There may be different ways for the second wireless device 12b to perform the network attempt in step S202. For example, the attempt to make a network connection may involve the second wireless device 12b to detect a broadcast-type signal and to transmit a radio signal to make the connection. In more detail, the attempt to make a network connection may involve the second wireless device 12b to detect a broadcast-type signal from at least the first wireless device 12a (and possibly other wireless devices and network nodes as well). This detection is as such not known to the first wireless device 12a. The first wireless device 12a may represent the wireless device to which the second wireless device 12a can establish the best network connection according to some quality criteria (such as, but not limited to, highest QoS, highest signal to noise ratio, etc.). Thus, the radio signal may then be transmitted to the first wireless device 12a to request the network connection in a random access like procedure. Particularly, the second wireless device 12b may be configured to in an optional step S202a perform the attempt to make the network connection by receiving a broadcast message from the network node 11 and/or a discovery message from the first wireless device 12a.

Different embodiments relating to wireless link determination aspects of the second wireless device 12b will now be described in turn.

As noted above, the second wireless device 12b may receive the control information from the network node 11 and/or the first wireless device 12a.

According to a first embodiment the network node 11 is always given priority when a connection is to be established. The second wireless device 12b may therefore be configured to in an optional step S220a, in a case the second wireless device 12b receives the control information from both the network node 11 and the first wireless device 12a, establish a connection for D2D communications with the network node 11.

According to a second embodiment the first wireless node 12a is always given priority when a connection is to be established. The second wireless device 12b may therefore be configured to in an optional step S220b, in a case the second wireless device 12b receives the control information from both the network node 11 and the first wireless device 12a, establish a connection for D2D communications with the first wireless device 12a.

Determine according to criteria; signal strength (threshold), system load, received broadcasted information, explicit received instructions According to a third embodiment the determination regarding connection establishment is based according to criteria. Hence, the second wireless device 12b may be configured to in an optional step S218, in a case the second wireless device 12b receives the control information from both the network node 11 and the first wireless device 12a, determine which one of the network node 11 and the first wireless device 12a to establish a connection to based on signal strength, traffic load, received broadcasted information, and/or received explicit instructions.

The thus established link may be changed (e.g. as a consequence of the second wireless device 12b being handed over) after initial attachment. Hence, the second wireless device 12b may be configured to in an optional step S222 receive a command to establish a new connection for D2D communications with the other one of the network node 11 and the first wireless device 12a.

Further embodiments relating to methods for synchronization in a wireless D2D based communications network 10 of the first wireless device 12a and the second wireless device 12b will now be disclosed.

Particular embodiments of sub-channel selection relating to the first wireless device 12a and the second wireless device 12b will now be disclosed.

A default sub-channel (or frequency sub-band) may be defined for multiple wireless devices 12a, 12b that operate on a common narrow bandwidth. For example, the central 6 PRBs of the system bandwidth may be used as the default sub-channel. When a wireless device is out-of-coverage of the network node 11, such as the second wireless device 12b when the network node 11 has a coverage region 16b, it may search at least for a D2D synchronization signal (D2DSS) and/or control or system information on such a bandwidth, as in step S202 above. As noted above, the D2D22 may include a primary D2DSS (called PD2DSS) and a secondary D2DSS (called SD2DSS). For example, the second wireless device 12b may uses this bandwidth for detecting other devices, such as the first wireless device 12a, capable of D2D communication and possible to provide relayed connectivity towards the network node 11.

When, say, the central 6 PRBs are used as the default sub-channel, the D2DSS that are used for normal D2D communications links may be used by the second wireless device 12b to make initial connection. The first wireless device 12a and/or the network node 11 may transmit D2DSS periodically (and over the central 6 PRB) to facilitate connection of wireless devices that are not functionally bandwidth-limited.

Similarly, the default sub-channel may be used for connection (re-) establishment and/or for other control message signaling (e.g. signals provides paging or system information) of the second wireless device 12b with other wireless devices, such as the first wireless device 12a, over a D2D link 13b.

Once a D2D connection has been established on the default sub-channel, the connection may be moved to other sub-channel(s) (sub-bands), above referred to as operational sub-channel(s). One reason for moving the connection to such other sub-channel(s) may be to enable better spectrum utilization. Three different embodiments relating thereto will now be disclosed in more detail.

According to a first embodiment the operational sub-channels(s) have fixed frequency positions from the perspective of the second wireless device 12b. The second wireless device 12b may thus occupy a pre-defined, or configured, sub-channel (of, e.g., 6 PRBs). From the perspective of the network node 11 and/or first wireless device 12a serving the second wireless device 12b, several operational sub-channels(s) may be defined; one for a set of second wireless devices 12b.

According to a second embodiment the operational sub-channels(s) for the second wireless device 12b to use are defined by a frequency-hopping pattern from the perspective of the second wireless device 12b, where the second wireless device 12b thus hops from one sub-channel to another sub-channel in time, following a predefined pattern, as in above disclosed step S210. This predefined pattern may be defined by standard, or configured by the network node 11 and/or first wireless device 12a, as in step S108 above. From the perspective of the network node 11 and/or first wireless device 12a serving the second wireless device 12b, several fixed operational sub-channels(s) may be allocated aside to serve the frequency-hopping second wireless device 12b.

According to a third embodiment the operational sub-channels(s) are dynamically allocated in terms of bandwidth and/or frequency position in the carrier. The operational sub-channels are, according to this third embodiment, thus not fixed. When a network node 11 and/or first wireless device 12a signals a change of operating sub-channel, the second wireless device 12b tunes its communications interface 22, possibly by interaction with instructions as provided by the transmitter/receiver module 31b to the new operating sub-channel. The signaling/configuration may be relayed by the first wireless device 12a but originate from the network node 11.

For the first and second embodiments the signaling of the operational sub-band(s) may be accomplished by higher-layer (re-)configuration, such as through transmission of radio resource control (RRC) messages. The (re-)configuration can be initiated by the network node 11 and/or first wireless device 12a serving the second wireless device 12b.

As noted above, the second wireless device 12b may indicate a preference for the operational sub-channel during capabilities negotiation. For example, if the second wireless device 12b is already using a certain operational sub-channel it may want to reuse such sub-channel even when communicating with other devices, for increased efficiency.

For the FDD-type operation on the D2D link, the link 13b in the direction from the second wireless device 12b to the first wireless device 12a, or its link 13c to the network node 11, (analogous to uplink) and the link 13b in the direction from the first wireless device 12a, or the link 13c from the network node 11, to the second wireless device 12b (analogous to downlink) may reside in different sub-channels (frequency sub-bands). In general terms, the uplink and downlink sub-channels each may be defined independently in the system uplink and downlink bandwidth, although a relationship between the uplink sub-channels and its corresponding downlink sub-channels may be defined, e.g., for efficient operation. For TDD-type operation on the D2D links 13b, 13c, it is may be preferred that the uplink and the downlink sub-channels are paired such that when the second wireless device 12b operates on a sub-channel, the uplink and downlink transmission are over the same sub-channel within the overall system bandwidth available for the D2D link. This may allow for a simple implementation in the second wireless device 12b.

Further, the second wireless device 12b may be configured to perform time-division multiplexing (TDM) between such sub-channels based on some rules. For example, transmission of the payload data may be performed on the operational sub-channel, whilst at least some control signals and/or channels (e.g., D2DSS) are transmitted and/or received on the default sub-channel.

Additionally, rules may be defined for selecting the sub-channel to be used for transmission and/or reception of a given channel/signal depending, for example, on the content, target or purpose of such signal/channel. For example, as noted above, paging and/or random access-type of messages may be sent over a default sub-channel, whilst data channels may be sent over the operational sub-channel(s). Some cross-carrier scheduling mechanisms may also be supported where scheduling messages on the default sub-channel refer to data transmission on the operational sub-channel(s).

The above rules may be defined as a function of the capabilities of the second wireless device 12b in terms of transmitter and/or receiver chains, supported bandwidths for transmission and/or reception, or similar.

Particular embodiments of the synchronization signal relating to the first wireless device 12a and the second wireless device 12b will now be disclosed.

Two embodiments relating to placement of the synchronization signal in the sub-frames received by the second wireless device 12b will now be disclosed in detail. The below presented embodiments may be combined with any of the above disclosed embodiments relating to which operational sub-channels(s) to be used by the second wireless device 12b.

Figure 8:
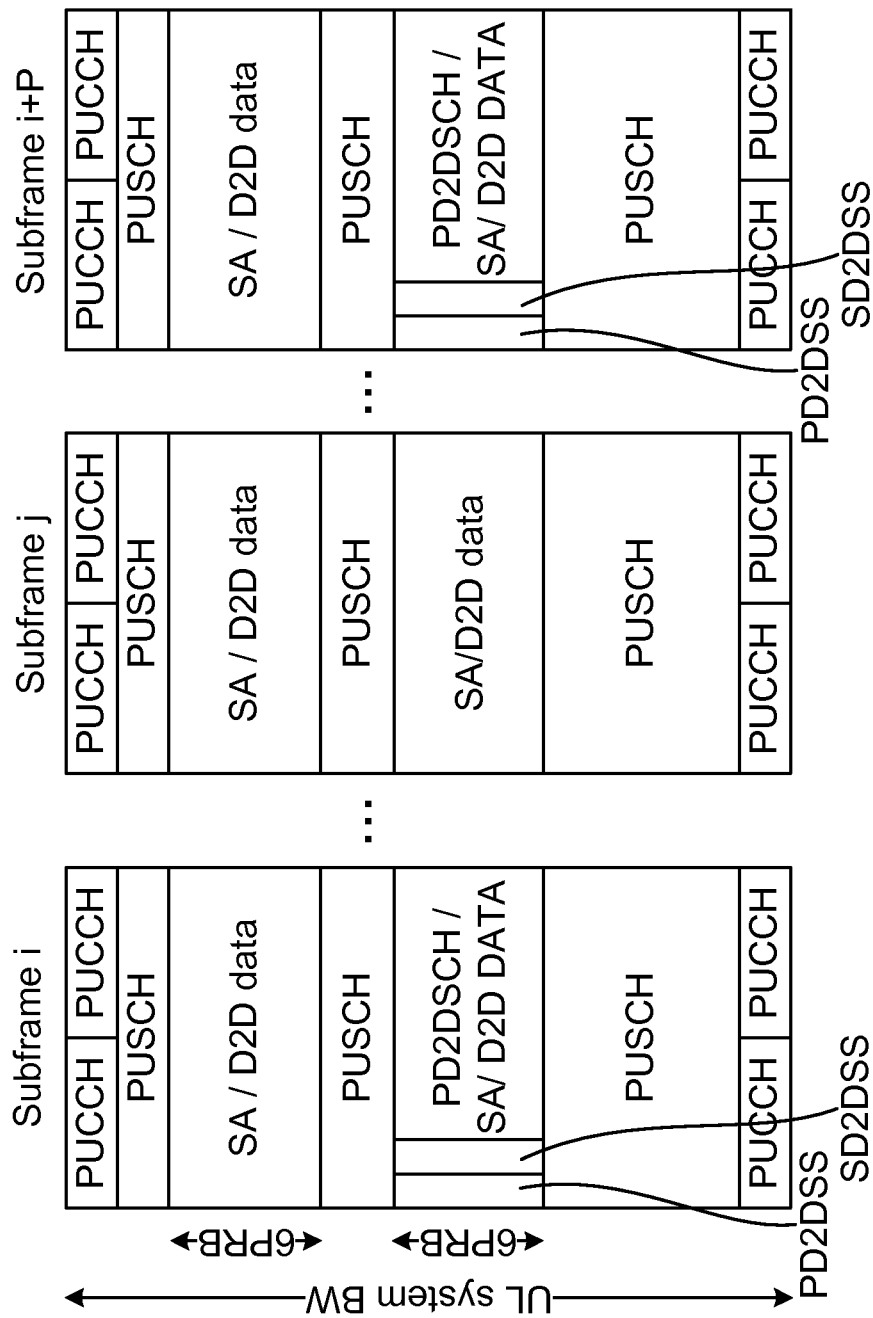
FIGS. 8 and 9 show examples of sub-frames according to embodiments.

According to a first embodiment, there is only one set of D2DSS which is located in the central 6 PRBs. This is illustrated in FIG. 8. FIG. 8 shows an example of sub-frames according to the present first embodiment. In FIG. 8 PUSCH is the Physical Uplink Shared Channel, PUCCH is the Physical Uplink Control Channel, and SA denotes Scheduling Assignments.

When the second wireless device 12b obtains the synchronization signal from the first wireless device 12a (or the network bode ii), the second wireless device 12b tunes to the central 6 PRBs. Scheduling assignments (SA) and D2D data channel may be located in the central 6 PRBs or located in another block of 6 PRBs. This may be sufficient when the second wireless device 12b does not need to receive D2DSS often. For example, the second wireless device 12b may only receive the D2DSS during initial attachment or when waking from deep sleep.

Figure 9:
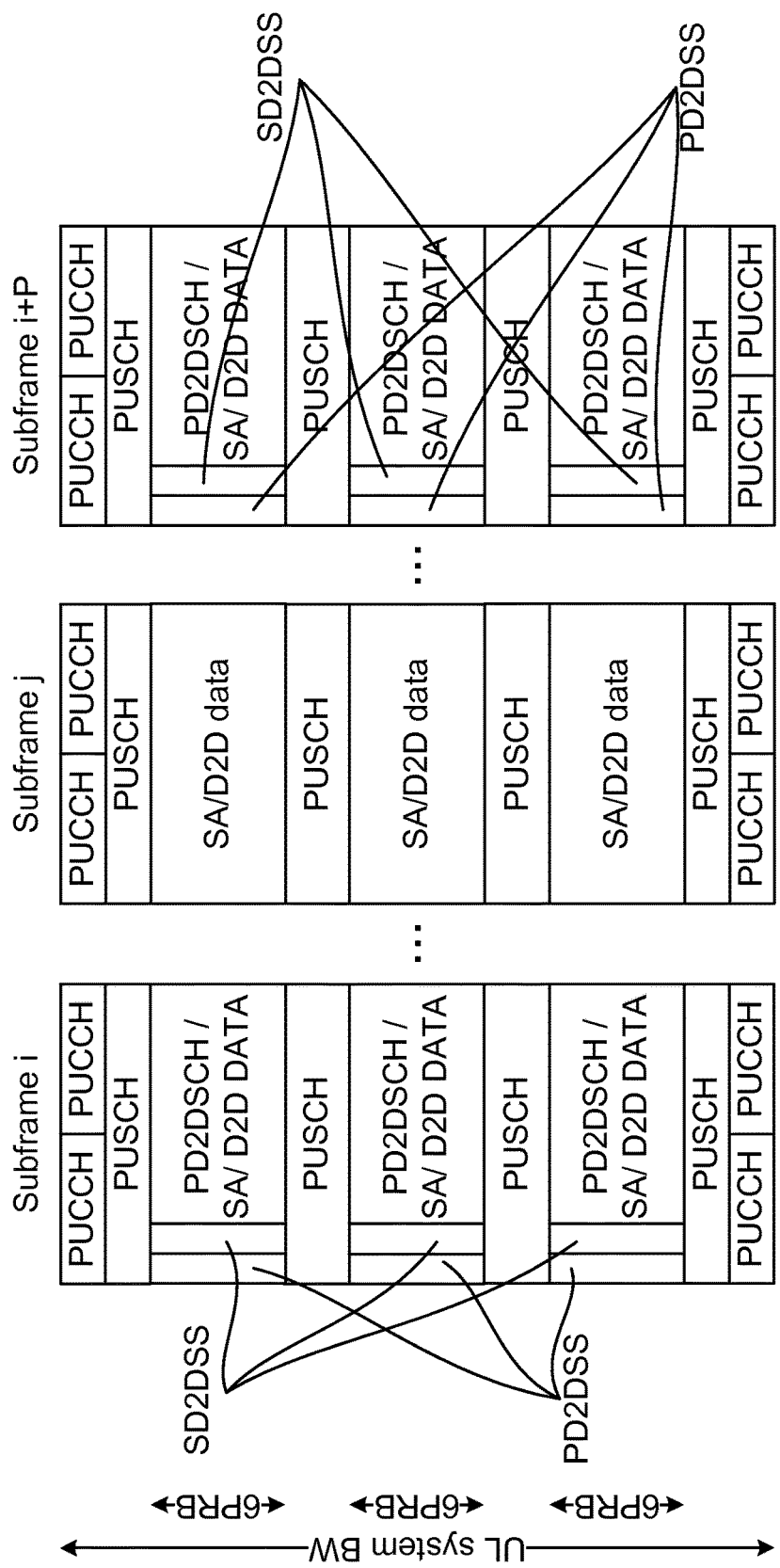

According to a second embodiment, multiple sets of D2DSS are defined, as illustrated in FIG. 9. FIG. 9 shows an example of sub-frames according to the present second embodiment. In FIG. 9 PUSCH is the Physical Uplink Shared Channel, PUCCH is the Physical Uplink Control Channel, and SA denotes Scheduling Assignments. In FIG. 9 three sub-channels are shown. Hence, there may be multiple self-contained sub-channels, each sub-channel being 6 PRBs wide in the frequency domain and comprising its own D2DSS, SA, and D2D data channel. Higher layer signaling may be used to configure the time-frequency domain location of the multiple sub-channels.

As noted above, the configuration may, via higher layer signaling, be determined by the network node 11, which is then signaled to the first wireless device 12a, and therefrom forwarded to the second wireless device 12b. The configuration may additionally or alternatively be proposed by the first wireless device 12a to the network node 11, taking into consideration the load on the first wireless device 12a. When acknowledged by the network node 11, the configuration may be used on the D2D link 13b between the first wireless device 12a and the second wireless device 12b.

For the examples in FIGS. 8 and 9 the periodicity is P sub-frames, where one sub-frame has a duration in time of 1 ms. A typical periodicity of the D2DSS is P=40. While in FIG. 9 it is assumed that the D2DSS of the sub-channels are aligned in time, in general the D2DSS of each sub-channel may have its own timing and thus not be aligned in time.

Parameters of the sub-channel may be semi-statically configured by higher-layer signal according to the need of the second wireless device 12b. Some parameters of the sub-channels include, but are not limited to: index of the sub-channel, the frequency domain location, the time-domain offset and periodicity, etc. The first wireless device 12a may receive the configuration from the network node 11. The parameters may be set according to the number of second wireless device 12b in the coverage region 16a, 16b, the relative load of the second wireless device 12b compared to normal load of the second wireless device 12b, and the service types of the second wireless device 12b, etc.

Since in the second embodiment there are multiple self-contained sub-channels, the second wireless device 12b may be configured to select the sub-channel with the best signal quality to attach to, taking advantage of frequency-selective channel conditions, i.e. by measuring the signal quality for respective synchronization signals. After synchronization, the second wireless device 12b may reside in the selected sub-channel for discovery and/or communication.

Furthermore, as noted above, the second wireless device 12b may be configured to perform semi-static frequency-hopping between sub-channels. In such cases, the first wireless device 12a and the second wireless device 12b may thus follow a predefined frequency hopping pattern that is known both for transmitting and receiving radio signal over the D2D link 13b, and may be defined by standard or configured by the network node 11 or the first wireless device 12a.

Particular embodiments of link selection relating to the first wireless device 12a and the second wireless device 12b will now be disclosed.

As noted above, the second wireless device 12b may only consider two sources of the synchronization signal; the network node 11 or the first wireless device 12a. When the second wireless device 12b receives the synchronization signal only from the network node 11, the second wireless device 12b may establish a connection with the network node 11 directly for data communication. This may occur if no first wireless device 12a is deployed nearby to serve the second wireless device 12b, or if the second wireless device 12b fails to receive the synchronization signal from the first wireless device 12a.

When the second wireless device 12b receives the synchronization signal only from the first wireless device 12a, the second wireless device 12b connects to the first wireless device 12a on a D2D link, and relies on the D2D link for connection to the service network. This may be a typical scenario for out-of-coverage of the second wireless device 12b, e.g., for a second wireless device 12b located in the basement of buildings.

When the second wireless device 12b is able to receive the synchronization signal from both the network node 11 and the first wireless device 12a there are at least three alternatives for initial attachment, as will be further disclosed in the below three embodiments.

The below presented embodiments may be combined with any of the above disclosed embodiments relating to which operational sub-channels(s) to be used by the second wireless device 12b as well as with any of the above disclosed embodiments relating to placement of the synchronization signal in the sub-frames received by the second wireless device 12b.

In a first embodiment the second wireless device 12b always gives a network node 11 higher priority than a first wireless device 12a, as in step S220a above. This option may, for example, be proper for a second wireless device 12b located in good cellular coverage and hence may in some scenarios be the desired choice if the second wireless device 12b when scanning for network nodes 11 to connect to finds a network node 11 with a signal strength (such as reference signal received power, RSRP) fulfilling a quality requirement, such as being above a first threshold. This first threshold may be pre-defined by a standard or may be pre-configured in the second wireless device 12b, for instance stored on the operator subscriber identity module (SIM) card and/or in the storage medium 23.

In a second embodiment the second wireless device 12b always gives the first wireless device 12a higher priority than the network node 11, as in step S220b above. This option may, for example, be proper if the second wireless device 12b is in poor coverage of network node 11, e.g., by not fulfilling the above noted quality criterion, such as being below a second threshold. This second threshold may be pre-defined by a standard or may be pre-configured in the second wireless device 12b, for instance stored on the operator subscriber identity module (SIM) card and/or in the storage medium 23. This option may further be useful if the first wireless device 12a is aggregating data communication for many second wireless devices 12b so that the load of the network node 11 may be reduced. Hence, the second wireless device 12b may, once determining that there is a presence of a first wireless device 12a that broadcasts (either via a broadcast channel or in a discovery message) that second wireless device 12b should prioritize connecting to the first wireless device 12a over the network node 11, the second wireless device 12b connects to the first wireless device 12a even if the above noted quality criterion is fulfilled. The first wireless device 12a may further be configured with such instructions (i.e., that the second wireless device 12b should, if possible, connect to the first wireless device 12a) from the network node 11.

In a third embodiment the second wireless device 12b may use either the direct link to the network node 11 or the link to the first wireless device 12a for operation according to certain criteria, as in step S118 above. Such criteria may, for example, include but not limited to, signal strength (such as RSRP), load criteria and/or received broadcasted information form either the first wireless device 12a or the network node 11. Such certain criteria may further include link quality comparison, and service quality desired by the second wireless device 12b, etc.

After the initial attachment, the network node 11 and/or the first wireless device 12a may change the link for the second wireless device 12b using a handover-like procedure, as in above step S222. Such handover-like procedures may be performed due to load balancing consideration, radio link failure, etc.

The inventive concept has mainly been described above with reference to a few embodiments. However, as is readily appreciated by a person skilled in the art, other embodiments than the ones disclosed above are equally possible within the scope of the inventive concept, as defined by the appended patent claims. For example, for simplicity, it has been assumed that there is one relay hop between the second wireless device 12b and the network node 11. However, in general, there may be multiple relay hops between the network node 11 and the second wireless device 12b.

The invention claimed is:

1. A method for synchronization in a wireless device-to-device (D2D) based communications network, the method being performed by a first wireless device, comprising:
identifying an attempt for network connection on a default sub-channel over a D2D communications interface from a second wireless device; and
transmitting control information on said default sub-channel to said second wireless device, wherein said control information comprises an indicator of an operational sub-channel that is available for subsequent D2D communication between the first wireless device and the second wireless device.

2. The method according to claim 1, further comprising:
determining an available sub-channel to use as said operational sub-channel based on a Quality of-Service (QoS) requirement of data content to be transmitted on said operational sub-channel.

3. The method according to claim 1, wherein messages on said default sub-channel are provided in sub-frames, and wherein said default sub-channel comprises a set of physical resource blocks, PRBs, located at a system bandwidth center in said sub-frames.

4. The method according to claim 1, wherein the operational sub-channel is different from the default sub-channel.

5. The method according to claim 1, wherein messages on said operational sub-channel are provided in sub-frames, the method further comprising:
transmitting a synchronization signal over the operational sub-channel in every P:th sub-frame, where P>1 is an integer.

6. The method according to claim 1, wherein number of available sub-channels depends on system bandwidth of said wireless D2D based communications network.

7. The method according to claim 1, further comprising:
receiving at least one communications capability of the second wireless device; and
determining the indicator of the operational sub-channel according to the at least one communications capability of the second wireless device.

8. The method of claim 1, further comprising:
establishing a wireless link to a network node, wherein communications over said wireless link and communication to said second wireless device are time-division multiplexed.

9. The method according to claim 1, further comprising:
receiving a radio resource configuration message from a network node, said radio resource configuration message indicating said operational sub-channel.

10. The method according to claim 9, wherein said radio resource configuration message is based on load information of said network node.

11. A method for synchronization in a wireless device-to-device (D2D) based communications network, the method being performed by a second wireless device, comprising:
performing an attempt to make a network connection on a default sub-channel; and
receiving control information on said default sub-channel from at least one of a network node or a first wireless device, wherein said control information comprises an indicator of an operational sub-channel that is available for subsequent D2D communications with said first wireless device.

12. The method according to claim 11, wherein frequency location of said operational sub-channel is timing based fixed or fixed until a control signal to change said frequency location is received.

13. The method according to claim 11, wherein frequency location of said operational sub-channel varies over time according to a frequency-hopping pattern, the method further comprising:
receiving information of said frequency-hopping pattern from either said network node or said first wireless device.

14. The method according to claim 13, further comprising:
performing frequency-hopping according to said frequency-hopping pattern to support communication over said operational sub-channel.

15. The method according to claim 14, wherein frequency location of said operational sub-channel is dynamically allocated.

16. The method according to claim 11, wherein said control information is received in a radio resource control message.

17. The method according to claim 11, further comprising:
transmitting an indicator of a desired sub-channel to be used as a subsequent operational sub-channel to that one of said network node and said first wireless device from which said control information is received.

18. The method according to claim 17, wherein said desired sub-channel is an operational sub-channel already in use for D2D communications by said second wireless device.

19. The method according to claim 11, further comprising:
communicating a broadcast message on said default sub-channel; and
communicating a unicast message on said operational sub-channel.

20. The method according to claim 11, further comprising:
receiving D2D synchronization signals (D2DSS) on said default sub-channel.

21. The method according to claim 20, wherein said D2DSS comprises a primary D2DSS (PD2DSS) and a secondary D2DSS (SD2DSS).

22. The method according to claim 20, wherein said D2DSS are received during a wake-up procedure of the second wireless device.

23. The method according to claim 11, wherein said control information further comprises at least one of an index to said operational sub-channel, frequency domain location of said operational sub-channel, time-domain offset of said operational sub-channel, and periodicity of said operational sub-channel.

24. The method according to claim 11, wherein performing said attempt to make network connection comprises:
receiving at least one of a broadcast message from said network node and a discovery message from said first wireless device.

25. The method according to claim 11, wherein in a case said second wireless device receives said control information from both said network node and said first wireless device:
establishing a connection for D2D communications with said network node.

26. The method according to claim 11, wherein in a case said second wireless device receives said control information from both said network node and said first wireless device:
    establishing a connection for D2D communications with said first wireless device.

27. The method according to claim 11, wherein in a case said second wireless device receives said control information from both said network node and said first wireless device:
    determining which one of said network node and said first wireless device to establish a connection to based on at least one of signal strength, traffic load, received broadcasted information, and received explicit instructions.

28. The method according to claim 25, further comprising:
    receiving a command to establish a new connection for D2D communications with the other one of said network node and said first wireless device.

29. A wireless device for synchronization in a wireless device-to-device (D2D) based communications network, the wireless device comprising a processing unit configured to:
    identify an attempt to make a network connection on a default sub-channel over a D2D communications interface from a second wireless device; and
    transmit control information on said default sub-channel to said second wireless device, wherein said control information comprises an indicator of an operational sub-channel that is available for subsequent D2D communication between the first wireless device and the second wireless device.

30. A wireless device for synchronization in a wireless device-to-device (D2D) based communications network, the wireless device comprising a processing unit configured to:
    perform an attempt to make a network connection on a default sub-channel; and
    receive control information on said default sub-channel from at least one of a network node or a first wireless device, wherein said control information comprises an indicator of an operational sub-channel that is available for subsequent D2D communications with said first wireless device.

31. A non-transitory processor readable storage medium comprising a computer program for synchronization in a wireless device-to-device (D2D) based communications network, the computer program comprising computer program code which, when run on a processing unit of a first wireless device causes the processing unit to:
    identify an attempt to make a network connection on a default sub-channel over a D2D communications interface from a second wireless device; and
    transmit control information on said default sub-channel to said second wireless device, wherein said control information comprises an indicator of an operational sub-channel that is available for subsequent D2D communication between the first wireless device and the second wireless device.

32. A non-transitory processor readable storage medium comprising a computer program for synchronization in a wireless device-to-device (D2D) based communications network, the computer program comprising computer program code which, when run on a processing unit of a second wireless device causes the processing unit to:
    perform an attempt to make a network connection on a default sub-channel; and
    receive control information on said default sub-channel from at least one of a network node or a first wireless device, wherein said control information comprises an indicator of an operational sub-channel that is available for subsequent D2D communications with said first wireless device.

* * * * *